US010326591B2

(12) United States Patent
Yuan et al.

(10) Patent No.: US 10,326,591 B2
(45) Date of Patent: Jun. 18, 2019

(54) EFFICIENT QUANTUM KEY MANAGEMENT

(71) Applicant: Alibaba Group Holding Limited, George Town, Grand Cayman (KY)

(72) Inventors: Peng Yuan, Beijing (CN); Zhiqiang Wang, Hangzhou (CN); Shuanlin Liu, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 199 days.

(21) Appl. No.: 15/402,030

(22) Filed: Jan. 9, 2017

(65) Prior Publication Data

US 2017/0237559 A1 Aug. 17, 2017

(30) Foreign Application Priority Data

Feb. 15, 2016 (CN) .......................... 2016 1 0086096

(51) Int. Cl.
*H04L 9/08* (2006.01)
*H04L 9/12* (2006.01)
*H04L 9/14* (2006.01)

(52) U.S. Cl.
CPC .......... *H04L 9/0858* (2013.01); *H04L 9/0819* (2013.01); *H04L 9/0861* (2013.01); *H04L 9/12* (2013.01); *H04L 9/14* (2013.01)

(58) Field of Classification Search
CPC . H04L 9/0858; H04L 9/12; H04L 9/14; H04L 9/0819; H04L 9/0861
See application file for complete search history.

(56) References Cited

U.S. PATENT DOCUMENTS 5,307,410 A 4/1994 Bennett
5,675,648 A 10/1997 Townsend
(Continued)

FOREIGN PATENT DOCUMENTS

EP 0962070 12/1999
WO 2012098543 7/2012
(Continued)

OTHER PUBLICATIONS

Tien-Sheng Lin, et al., Quantulm Aulthentication and Secure Communication Protocols, 2006 IEEE (Year:2006).
(Continued)

*Primary Examiner* — Tri M Tran
(74) *Attorney, Agent, or Firm* — Shun Yao; Park, Vaughan, Fleming & Dowler LLP (57) ABSTRACT

One embodiment of the present application provides a system for key management. During operation, the system determines a key block from a key sequence obtained based on Quantum Key Distribution (QKD) and a time sequence identifier for the key block. The system synchronizes the key block with a corresponding key block of a partner key management system based on a hash of the key block and the time sequence identifier. If the synchronization is successful, the system stores the key block and the time sequence identifier in a key pool. If the system receives a request for a key from an application, the system acquires the key block from the key pool and validates the key block with the partner key management system based on a hash of the key block and the time sequence identifier. If the validation is successful, the system provides the key block to the application.

22 Claims, 8 Drawing Sheets

(56) References Cited

U.S. PATENT DOCUMENTS

| | | |
|---|---|---|
| 6,505,247 B1 | 1/2003 | Steger |
| 9,077,577 B1 | 7/2015 | Ashrafi |
| 9,294,267 B2 | 3/2016 | Kamath |
| 9,323,901 B1 | 4/2016 | Nair |
| 9,887,976 B2 | 2/2018 | Hughes |
| 2005/0071677 A1 | 3/2005 | Khanna |
| 2005/0144440 A1 | 6/2005 | Catherman |
| 2005/0144484 A1 | 6/2005 | Wakayama |
| 2005/0259825 A1 | 11/2005 | Trifonov |
| 2006/0026693 A1 | 2/2006 | Bade |
| 2006/0056630 A1 | 3/2006 | Zimmer |
| 2007/0016794 A1 | 1/2007 | Harrison |
| 2007/0076889 A1 | 4/2007 | Derobertis |
| 2007/0147292 A1 | 6/2007 | Van Ewijk |
| 2007/0192598 A1* | 8/2007 | Troxel ............... H04L 9/0852 713/168 |
| 2008/0114983 A1 | 5/2008 | Sherkin |
| 2008/0123859 A1 | 5/2008 | Mamidwar |
| 2008/0165973 A1 | 7/2008 | Miranda Gavillan |
| 2008/0219449 A1 | 9/2008 | Ball et al. |
| 2008/0222734 A1 | 9/2008 | Redlich |
| 2009/0034733 A1 | 2/2009 | Raman |
| 2009/0055892 A1 | 2/2009 | Lu |
| 2009/0092252 A1 | 4/2009 | Noll |
| 2009/0106551 A1 | 4/2009 | Boren |
| 2009/0204812 A1 | 8/2009 | Baker |
| 2009/0271634 A1 | 10/2009 | Boult |
| 2010/0169953 A1 | 7/2010 | Hofer |
| 2010/0199336 A1 | 8/2010 | Tan |
| 2010/0211787 A1 | 8/2010 | Bukshpun |
| 2010/0265077 A1 | 10/2010 | Humble |
| 2011/0069972 A1 | 3/2011 | Wiseman |
| 2011/0099367 A1 | 4/2011 | Thom |
| 2011/0209202 A1 | 8/2011 | Otranen |
| 2011/0213979 A1 | 9/2011 | Wiseman |
| 2011/0231615 A1 | 9/2011 | Ober |
| 2012/0045002 A1 | 2/2012 | Zivkovic |
| 2012/0166993 A1 | 6/2012 | Anderson |
| 2012/0177201 A1 | 7/2012 | Ayling |
| 2012/0210408 A1 | 8/2012 | Lu |
| 2012/0250863 A1* | 10/2012 | Bukshpun ............ H04L 9/0838 380/278 |
| 2012/0265892 A1 | 10/2012 | Ma |
| 2013/0083926 A1 | 4/2013 | Hughes et al. |
| 2013/0101119 A1 | 4/2013 | Nordholt |
| 2013/0227286 A1 | 8/2013 | Brisson |
| 2013/0246641 A1 | 9/2013 | Vimpari |
| 2013/0251145 A1 | 9/2013 | Lowans et al. |
| 2014/0141725 A1 | 5/2014 | Jesme |
| 2014/0237565 A1 | 8/2014 | Fleysher |
| 2014/0259138 A1 | 9/2014 | Fu |
| 2014/0281511 A1 | 9/2014 | Kaushik |
| 2014/0331050 A1 | 11/2014 | Armstrong |
| 2014/0351915 A1 | 11/2014 | Otranen |
| 2015/0046709 A1 | 2/2015 | Anspach |
| 2015/0095987 A1 | 4/2015 | Potash |
| 2015/0181308 A1 | 6/2015 | Ducharme |
| 2015/0222619 A1 | 8/2015 | Hughes |
| 2015/0236852 A1 | 8/2015 | Tanizawa |
| 2015/0288517 A1 | 10/2015 | Evans |
| 2015/0288542 A1 | 10/2015 | Ashrafi |
| 2015/0317469 A1 | 11/2015 | Liu |
| 2015/0325242 A1 | 11/2015 | Lu |
| 2015/0326613 A1 | 11/2015 | Devarajan |
| 2015/0350181 A1 | 12/2015 | Call |
| 2015/0379261 A1 | 12/2015 | Daigle |
| 2015/0381363 A1 | 12/2015 | Teixeira |
| 2016/0021068 A1 | 1/2016 | Jueneman |
| 2016/0080708 A1 | 3/2016 | Urata |
| 2016/0105439 A1 | 4/2016 | Hunt |
| 2016/0210105 A1 | 7/2016 | Ru |
| 2016/0226846 A1 | 8/2016 | Fu |
| 2016/0241396 A1 | 8/2016 | Fu |
| 2016/0248581 A1 | 8/2016 | Fu |
| 2016/0294783 A1 | 10/2016 | Piqueras Jover |
| 2016/0359839 A1 | 12/2016 | Natividad |
| 2017/0034167 A1 | 2/2017 | Figueira |
| 2017/0302448 A1 | 10/2017 | Luk |
| 2017/0324730 A1 | 11/2017 | Otranen |

FOREIGN PATENT DOCUMENTS

| | | |
|---|---|---|
| WO | 2013026086 | 2/2013 |
| WO | 2016070141 | 5/2016 |

OTHER PUBLICATIONS

Charles H. Bennett et al., Quantum cryptography: Public key distribution and coin tossing, www. elsevier.com/locate/tcx, 2014 (Year: 2014).

R. Alleaume et al., Using Quantum key distribution for cryptographic purposes: A survey, www.elsevier.com/locate/tcs, 2009 (Year:2009).

Toung-Shang Wei et al., Comment on "Quantum Key Distribution and Quantum Authentication Based on Entangled State", Springer, 2011 (Year: 2011).

Ivan Damgard et al., Secure Identification and QKD in the bounded-quantum-storage model, www.elsevier.com/locate/tcs, 2009 (Year: 2009).

Valerio Scarani et al., The black paper of quantum cryptography: Real implementation problems, www.elsevier.com/locate/tcs, 2014.

Jung-Lun Hsu et al., Dynamic quantum secret sharing, Springer, 2012.

Ci-Hong Liao et al., Dynamic quantum secret sharing protocol based on GHZ state, Springer, 2014.

Xugang Ren et al., A Novel Dynamic User Authentication Scheme, 2012 International Symposium on Communications and Information Technologies, 2012.

Phyllis A. Schneck et al., Dynamic Authentication for High-Performance Networked Applications, 1998 IEEE.

Lanjun Dang, An Improved Mutual Authentication Scheme for Smart Card Secure Messaging, Proceedings of the IEEE International Conference on E-Commerce Technology for Dynamic E-Business (CEC-East'04), 2004.

Wenjie Liu, et al., Authenticated Quantum Secure Direct Communication with Qutrits, Fourth International Conference on Natural Computation, IEEE 2008.

* cited by examiner

EFFICIENT QUANTUM KEY MANAGEMENT

RELATED APPLICATION

Under 35 U.S.C. § 119, this application claims the benefit and right of priority of Chinese Patent Application No. 201610086096.7, filed 15 Feb. 2016.

BACKGROUND

Field

The present invention relates to the technical field of web interface management and, in particular, relates to a method and system for efficiently managing quantum key distribution in a distributed environment.

Related Art

With the rapid development of the Internet, contents of a web environment, such as an e-commerce website, are becoming richer. To facilitate secure access to the contents the users are interested in, such websites can ensure the contents and transactions are secured with distributed keys. Quantum Key Distribution (QKD) is an efficient way of facilitating secure communication. QKD allows communicating users to detect the presence of an entity trying to gain knowledge of a key obtained based on QKD. Since measuring a quantum system, in principal, disturbs the system, the entity eavesdropping on the key introduces detectable anomalies through its measurement. In this way, using QKD, a communication system can be implemented that detects eavesdropping by transmitting information in quantum states. Typically, the QKD process uses key screening, error code correction, and a privacy amplification algorithm to securely provide keys to the entities involved in communication. However, network data transmission can be lossy, and as a result, the probability of encountering an error in the key synchronization remains significant. If such an error occurs when the key sequences are processed, the keys stored at the entities may become unsynchronized.

With existing technologies, if two applications use keys to ensure secure communication, the applications may share a tag to obtain the keys. When needed, the applications provide the tag and a length of key to the local system. The system obtains a key block with the corresponding length from the start of a key pool and initiates a synchronization request with the remote system. The system sends the length parameters and the hash values of the selected key to the remote system. Upon receiving the synchronization request, the remote system also obtains a key block with the corresponding length from its key pool, calculates the hash value, and compares the hash value with the received hash value. However, if the hash values do not match, the systems notify each other regarding a failed synchronization and discard the corresponding key. The applications then again request another key from the corresponding key pool.

While such key management brings many desirable features to a distributed environment, some issues remain unsolved in the synchronization of keys in a multi-party distributed environment.

SUMMARY

One embodiment of the present application provides a system for efficient key management. During operation, the system determines a key block from a key sequence obtained based on Quantum Key Distribution (QKD) and a time sequence identifier for the key block. The system then synchronizes the key block with a corresponding key block of a partner key management system based on a hash of the key block and the time sequence identifier. If the synchronization is successful, the system stores the key block and the time sequence identifier in a local key pool. If the system receives a request for a key from an application, the system acquires the key block from the key pool and validates the key block with a partner key management system based on a hash of the key block and the time sequence identifier. If the validation is successful, the system provides the key block to the application.

In a variation of this embodiment, the system determines the key block by determining whether a length of the key sequence has reached a threshold. Furthermore, if the length of the key sequence reaches the threshold, the system obtains key block of the threshold length from the beginning of the key sequence.

In a variation of this embodiment, the system determines the time sequence identifier by obtaining a base value and incrementing the base value.

In a variation of this embodiment, the system synchronizes the key block by computing a hash of the key block, and sending the key block and the time sequence identifier to the partner key management system. Furthermore, if the system detects a time sequence identifier mismatch, the system sets a larger of local and received time sequence identifiers to be a new base value and the time sequence identifier of the key block.

In a further variation, the system discards the key block in response to determining a hash mismatch of the key block.

In a variation of this embodiment, the key pool is a data structure. A respective element of the data structure includes a key block and an associated time sequence identifier.

In a further variation, the system maintains a read pointer and a write pointer. The read pointer indicates a location of the key pool from which the key block is retrieved. The write pointer indicates a location of the key pool where a new key block is added.

In a variation of this embodiment, the system validates the key block by computing a hash of the key block and obtaining a key block and the time sequence identifier from the partner key management system. Furthermore, for time sequence identifier mismatch, the system identifies a second key block that provides a time sequence identifier match.

In a further variation, the system identifies a second key block by determining that the time sequence identifier of the key block is less than the obtained time sequence identifier and obtaining, from the key pool, a key block that has a time sequence identifier matching the obtained time sequence identifier. To do so, the system discards any key block that has a time sequence identifier less than the obtained time sequence identifier from the key pool.

BRIEF DESCRIPTION OF THE DRAWINGS

The accompanying drawings herein, which are incorporated herein and constitute a part of the specification, illustrate several exemplary embodiments of the present application and, together with the description, serve to illustrate the present application, construing no limitation thereto. In the drawings.

In the figures, like reference numerals refer to the same figure elements.

DETAILED DESCRIPTION OF EMBODIMENTS

Embodiments of the present invention solve the problem of facilitating efficient quantum key management in a distributed environment by (i) maintaining a time sequence identifier for a key block; and (ii) synchronizing key blocks until the time sequence identifiers at the partner systems match.

Suppose that two devices coupled via a network use quantum keys to ensure secure communication. The key management systems running on these devices can be referred to as partner systems. Such a system can include a quantum engine and a key manager. The quantum engine is responsible for obtaining a key sequence and providing the key sequence to the key manager. The key manager is responsible for maintaining the key sequence and providing a key block to a requesting application.

During operation, partner systems use key screening, error code correction, and a privacy amplification algorithm to obtain consistent and secure key sequences. These systems then store their key sequences in their respective trusted storage media. Such a key sequence is essentially a bit array, which appends newly generated keys. If an application running on two devices needs a key, the partner systems at those devices provide the key to the application. A respective partner system obtains a key block of a length requested by the application from the local key sequence (e.g., based on first-in-first-out). A respective partner system then provides the key block to the application running on the device.

However, when the keys are distributed across a network, the keys may become unsynchronized. For example, the keys at partner systems can become mismatched. Partner systems can also have unaligned key sequences (e.g., one system may lack a certain key sequence). Upon obtaining the key block, prior to providing the key block the application, partner systems check whether the key block is synchronized. With existing technologies, the partner systems discard the respective copies of the key block if they are unsynchronized and notify the application. The application then reinitiates the process. This repetition continues until the partner systems obtain a synchronized key block. However, if the key sequence is unaligned at the partner systems, a key block of a respective iteration would continue to be unsynchronized. As a result, the entire key sequence can be exhausted without producing a synchronized key block.

To solve this problem, an embodiment of the present invention maintains a time sequence identifier for a respective key block. In an embodiment, a length of a key block can be preset (which can be referred to as a threshold). Whenever the key sequence at the quantum engine reaches the threshold, the quantum engine generates a key block of the threshold length from the beginning of the key sequence. The quantum engine also adds a time sequence identifier to the key block and provides the key block to the key manager. Upon receiving the key block, the key manager stores the key block, along with the time sequence identifier, in a key pool. In an embodiment, the time sequence identifier is a counter (e.g., an integer) and the quantum engine increments the counter for each new key block. In this way, the time sequence identifier indicates the sequence of the key block (e.g., a larger counter value indicates a key block generated at a later time).

For each key block, the quantum engines of the partner systems exchange the time sequence identifier and a hash of the key block to synchronize with each other. A hash mismatch indicates that the key blocks at the partner systems are mismatched. On the other hand, if the hash matches, the quantum engines ensure the same time sequence identifier is associated with the key blocks at each partner system. If the time sequence identifiers do not match, the quantum engines set the larger value as the time sequence identifier, thereby ensuring a same value at each partner system.

When an application requests a key block, the key managers obtain a key block from the key pool, compute hash of the key block, and verify with each other's key block using the time sequence identifier and the hash. If the time sequence identifiers do not match, the key blocks are misaligned. The key manager with the smaller time sequence identifier then continues to discard key blocks until the time sequence identifiers match. In this way, the systems ensure that only the misaligned key blocks are discarded and prevent exhaustion of the entire key sequence.

Figure 1:
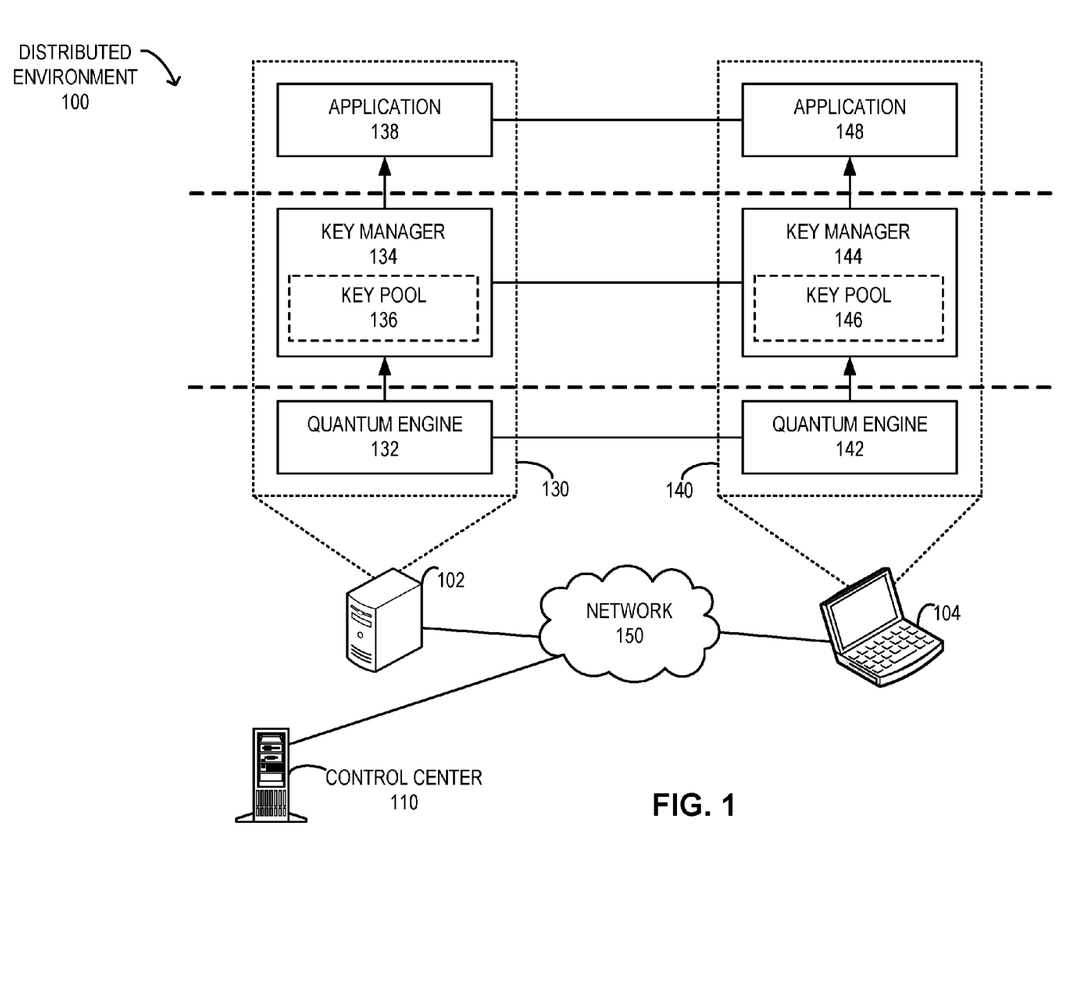
FIG. 1 illustrates an exemplary distributed environment facilitating a key management system for quantum keys, in accordance with an embodiment of the present application.

FIG. 1 illustrates an exemplary distributed environment facilitating a key management system for quantum keys, in accordance with an embodiment of the present application. In this example, a distributed environment 100 includes end devices 102 and 104 coupled via a network 150 (e.g., a local area network (LAN), a wide area network (WAN), the Internet, etc.). Suppose that devices 102 and 104 require a key-based secure communication between them (e.g., a client-server communication). Devices 102 and 104 can include key management systems 130 and 140, respectively, which facilitate quantum keys to ensure secure communication. Key management systems 130 and 140 can be referred to as partner systems.

System 130 can include a quantum engine 132 and a key manager 134. Similarly, system 140 can include a quantum engine 142 and a key manager 144. Quantum engines 132 and 142 are responsible for obtaining a key sequence and providing the key sequence to key managers 134 and 144, respectively. Key managers 134 and 144 are responsible for maintaining the key sequence and providing a key block to a requesting application.

During operation, systems 130 and 140 use key screening, error code correction, and a privacy amplification algorithm to obtain consistent and secure key sequences. With existing technologies, key managers 134 and 144 store their key sequences in their respective trusted storage media. If applications 138 and 148 running on devices 102 and 104 need a key among themselves, key managers 134 and 144 provide the key to applications 138 and 148, respectively. It should be notes that applications 138 and 148 can be the same application (e.g., a secure communication application) or a set of inter-dependent applications (e.g., a client and a server). Key manager 134 or 144 obtains a key block of a length requested by the application from the local key sequence and provides the key block to application 138 (or 148).

However, when the keys are distributed across network 150, the keys may become unsynchronized. For example, the keys at systems 130 and 140 can become mismatched. Systems 130 and 140 can also have unaligned key sequences (e.g., one system may lack a certain key sequence). Upon obtaining the key block, systems 130 and 140 check whether the key block is synchronized at each system. Typically, systems 130 and 140 discard the respective copies of the key block if they are unsynchronized and notify applications 138 and 148, respectively, which reinitiate the process. This repetition continues until systems 130 and 140 obtain a synchronized key block. However, if the key sequence is unaligned, a key block of a respective iteration would continue to be unsynchronized. As a result, the entire key sequence can be exhausted without producing a synchronized key block.

To solve this problem, systems 130 and 140 maintain a time sequence identifier for a respective key block. In an embodiment, whenever the key sequence at quantum engine 132 reaches the threshold, quantum engine 132 generates a key block of the threshold length from the beginning of the key sequence. Quantum engine 132 adds a time sequence identifier to the key block and provides the key block to key manager 134. Similarly, quantum engine 142 provides the key block to key manager 144. Upon receiving the key block, key manager 134 stores the key block, along with the time sequence identifier, in a key pool 136. Similarly, key manager 144 stores the key block, along with the time sequence identifier, in a key pool 146.

In an embodiment, the time sequence identifier is a counter generated and maintained by a control center 110 (e.g., a server), which provides the counter to quantum engines 132 and 142. In a further embodiment, quantum engines 132 and 142 generate and maintain the counter, and increment the counter for each new key block. In this way, the time sequence identifier indicates the sequence of the key block in key pools 136 and 146. For each key block, one of quantum engines 132 and 142 initiates a synchronization process. Suppose that quantum engine 132 is the initiator. Quantum engine 132 sends its time sequence identifier and a hash of the key block to quantum engine 142.

If quantum engine 142 detects a hash mismatch, quantum engine 142 determines a mismatch and notifies quantum engine 132. Quantum engines 132 and 142 then discard the key block. However, if the hash matches, quantum engine 142 checks whether the local and received time sequence identifiers match. If the time sequence identifiers do not match, quantum engine 142 sets the larger value as the new base for the time sequence identifier and allocates that value as the time sequence identifier for the key block. Quantum engine 142 also provides that value to quantum engine 132, which also sets the larger value as the new base for the time sequence identifier and allocates that value as the time sequence identifier for the key block.

Quantum engines 132 and 142 provide the key block and the time sequence identifier to key managers 134 and 144, respectively. Key managers 134 and 144 store the key block and the time sequence identifier in key pools 136 and 146. When application 138 requests a key block, key manager 134 obtain a key block from key pool 136 and validates that key block. To validate, key manager 134 computes a hash of the key block, and sends the time sequence identifier and the key block to key manager 144. Key manager 144 can also send the time sequence identifier to key manager 134. Key manager 144 checks whether the local and received time sequence identifiers match. If the time sequence identifiers do not match, the key blocks are misaligned.

Suppose that key manager 144 is the key manager with the smaller time sequence identifier. Key manager 144 then continues to discard key blocks until the time sequence identifiers match. In this way, key managers 134 and 144 ensure that only the misaligned key blocks are discarded and prevent exhaustion of the entire key sequence. Key manager 144 also checks whether the local and received hashes match. If key manager 144 detects a hash mismatch, key manager 144 determines a mismatch, which indicates invalid key blocks, and notifies key manager 134. Key managers 134 and 144 then discard the key block. However, if the hashes match, which indicates a valid key block, key manager 144 provides the key block to application 148 and notifies key manager 134. Upon receiving the notification, key manager 134 provides the key block to application 138.

Figure 2A:
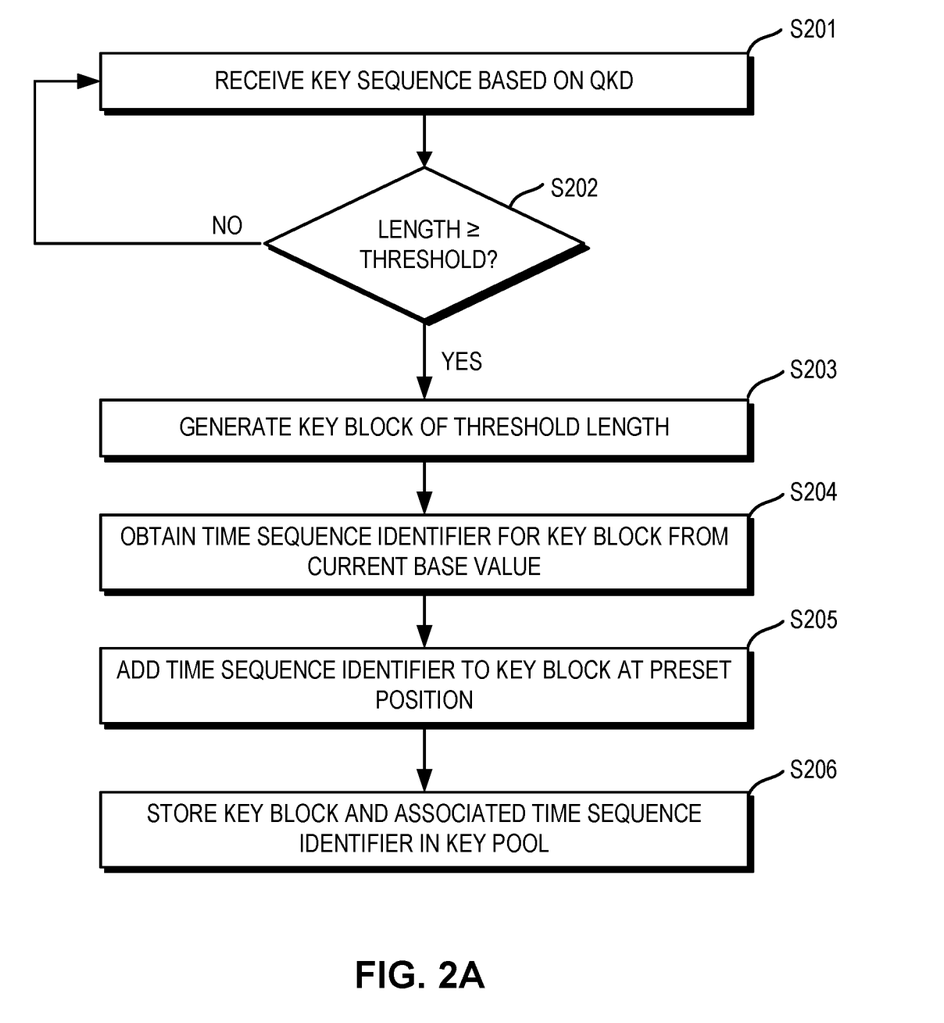
FIG. 2A presents a flowchart illustrating the process of a key management system initiating key synchronization, in accordance with an embodiment of the present application.

FIG. 2A presents a flowchart illustrating the process of a key management system initiating key synchronization, in accordance with an embodiment of the present application. During operation, the system receives a key sequence based on quantum key distribution (QKD) (operation S201). The system then determines whether the length of the key sequence is greater than or equal to the threshold (operation S202). This threshold can be generated by the system (e.g., based on empirical data or a configuration of an application) or be preset based on a configuration of the system. If the length is not greater than or equal to the threshold (i.e., is less than the threshold), the system continues to receive key sequences based on quantum key distribution (operation S201).

If the length is greater than or equal to the threshold, the system generates a key block of threshold length (operation S203) and obtains a time sequence identifier for the key block from a current base value (operation S204). This time sequence identifier can be a counter incremented from the base value. For example, if the current base value is 5, the time sequence identifier can be 6. The system then adds the time sequence identifier to the key block at a preset position (operation S205). This present position can be before or after the key block (append or prepend). The system then stores the key block and the associated time sequence identifier in a key pool (operation S206).

Figure 2B:
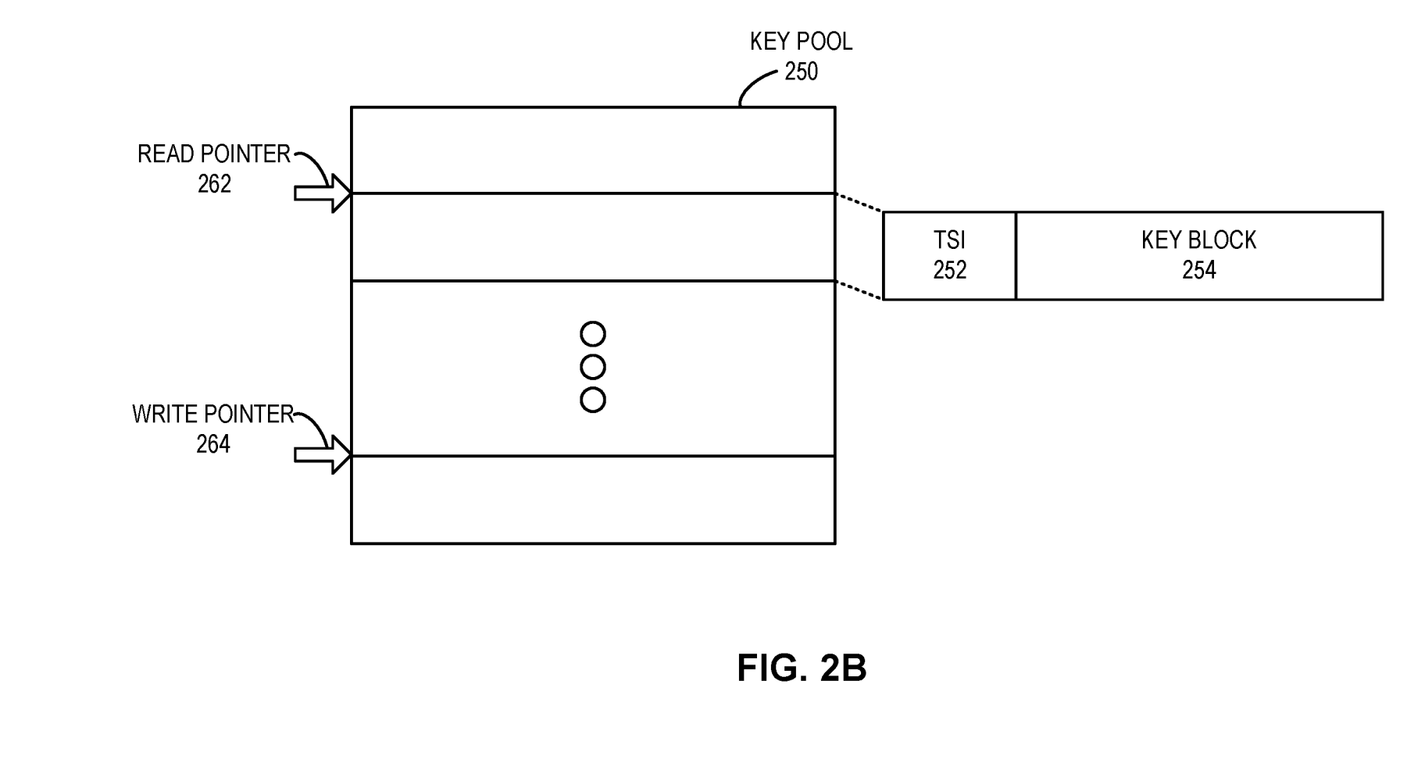
FIG. 2B illustrates an exemplary schematic of a pool of quantum keys maintained by a key manager, in accordance with an embodiment of the present application.

FIG. 2B illustrates an exemplary schematic of a pool of quantum keys maintained by a key manager, in accordance with an embodiment of the present application. In this example, a key pool 250 includes one or more key blocks and associated time sequence identifiers. In an embodiment, key pool 250 can be a queue. Examples of a queue include, but are not limited to, a linear queue (e.g., an array or a linked list), a random queue, and a circular queue (e.g., based on a linked list, where the last node of the list points to the first node). A respective element of a key pool (e.g., a node in a linked list) can include a key block and its associated time sequence identifier. For example, one of the elements of key pool 250 can include a key block 254 and an associated time sequence identifier 252.

The queue can have a read pointer 262 and a write pointer 264. When the key manager receives a new key block and its time sequence identifier, the key manager stores them in an element pointed to by write pointer 264 and moves write pointer 264 to the next element. If the queue is a linked list, the key manager stores the key block in the node pointed to by write pointer 264 and updates write pointer 264 to point to the next node of the linked list (i.e., to which the node points). When an application requests a key block, the key manager obtains the key block pointed to by read pointer 262 and moves read pointer 262 to the next element.

Figure 3A:
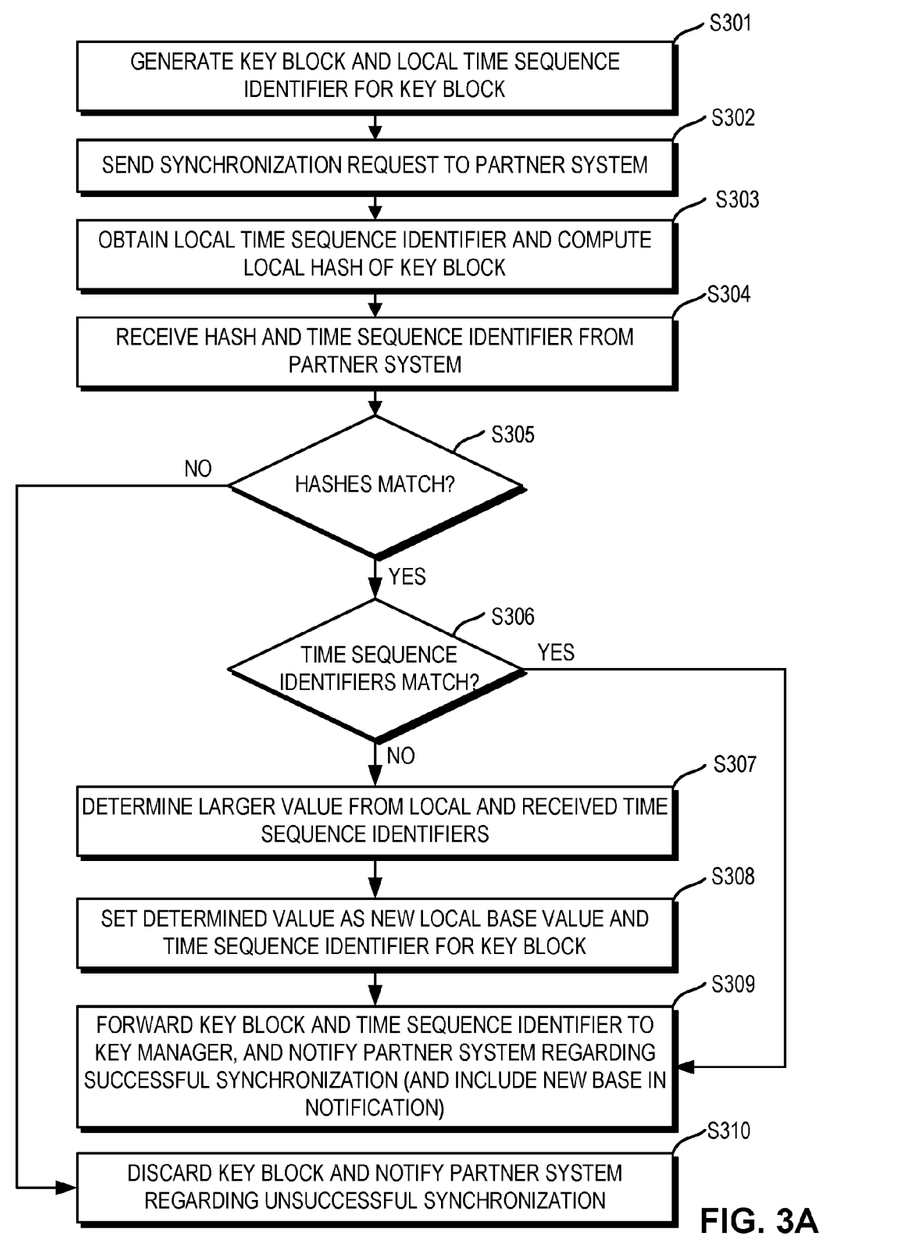
FIG. 3A presents a flowchart illustrating the process of an initiating quantum engine synchronizing a key block, in accordance with an embodiment of the present application.

FIG. 3A presents a flowchart illustrating the process of an initiating quantum engine synchronizing a key block, in accordance with an embodiment of the present application. During operation, the quantum engine generates a key block (e.g., when the length of the key sequence reaches a threshold) and a local time sequence identifier for the key block (operation S301). The quantum engine then sends a synchronization request to the partner system (operation S302). Sending the request includes generating a message, including the request in the message, determining an output port for the message based on the address of the device hosting the partner system, and transmitting the message via the determined output port. The quantum engine obtains the local time sequence identifier and computes the local hash of the key block (e.g., using a hash function) (operation S303). Examples of a hash function include, but are not limited to, MD5 algorithm, SHA1 algorithm, and SHA256 algorithm.

The quantum engine also receives the hash and time sequence identifier from the partner system (operation S304), and determines whether the local and received hashes match (operation S305). If not, the quantum engine discards the key block and notifies the partner system regarding the unsuccessful synchronization (operation S310). If the hash values match, the quantum engine determines whether the local and received time sequence identifiers match (operation S306). If not, the quantum engine determines the larger value from the local and received time sequence identifiers (operation S307) and sets the determined value as the new local base value and as the time sequence identifier for the key block (operation S308).

If the time sequence identifiers match (operation S306) or the determined value has been set as the new local base value (operation S308), the quantum engine forwards the key block and the time sequence identifier to the key manager, and notifies the partner system regarding successful synchronization (operation S309). If the quantum engine has set a new base value, the quantum engine can also include the new base value in the notification. In this way, the quantum engine of the partner system also receives the new base value and can adjust its own base value accordingly.

Figure 3B:
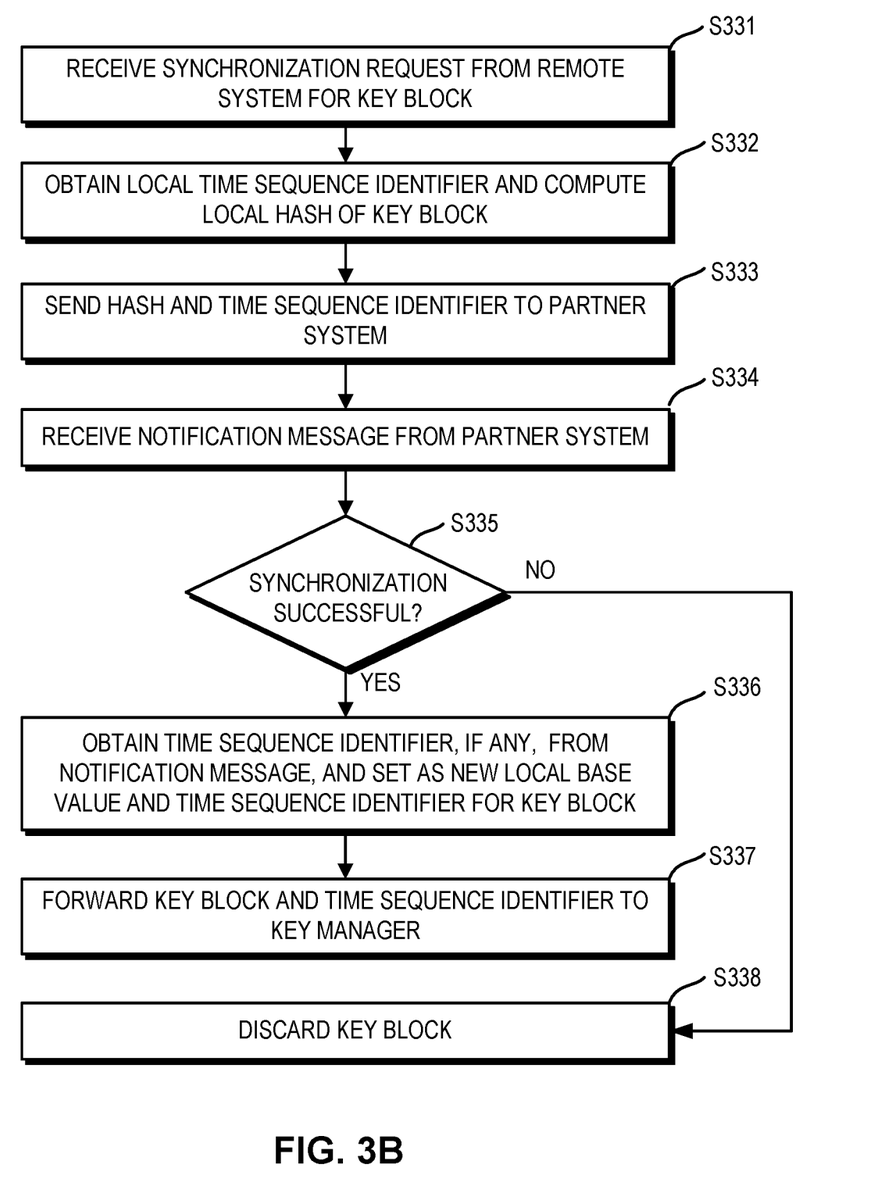
FIG. 3B presents a flowchart illustrating the process of a partner quantum engine synchronizing a key block, in accordance with an embodiment of the present application.

FIG. 3B presents a flowchart illustrating the process of a partner quantum engine synchronizing a key block, in accordance with an embodiment of the present application. During operation, the quantum engine receives a synchronization request from the remote system for a key block (operation S331). The quantum engine then obtains the local time sequence identifier and computes the local hash of the key block (operation S332), and sends the hash and the time sequence identifier to the partner system (operation S333). The quantum engine receives a notification message from the partner system (operation S334) and determines whether the synchronization has been successful (operation S335).

If the synchronization has been successful, the quantum engine obtains the time sequence identifier, if any, from the notification message, and sets a new local base value and the time sequence identifier for the key block (operation S336). The quantum engine then forwards the key block and the timer sequence identifier to the key manager (operation S337). If the synchronization has not been successful, the quantum engine discards the key block (operation S338).

Figure 4A:
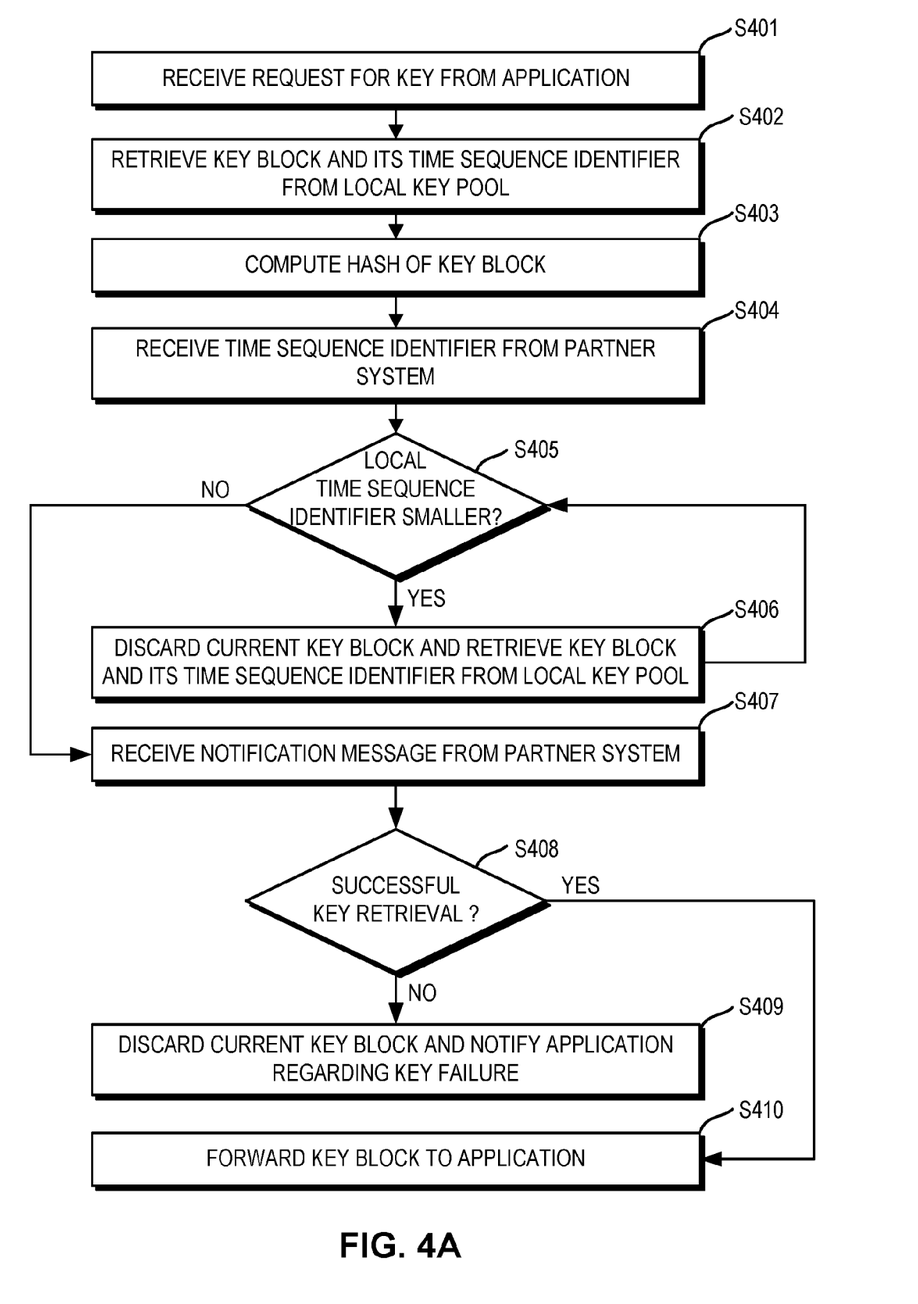
FIG. 4A presents a flowchart illustrating the process of an initiating key manager validating a key block, in accordance with an embodiment of the present application.

FIG. 4A presents a flowchart illustrating the process of an initiating key manager validating a key block, in accordance with an embodiment of the present application. During operation, the key manager receives a request for a key from an application (operation S401). The key manager retrieves a key block and its time sequence identifier from the local key pool (operation S402) and computes a hash of the key block (operation S403). The key manager can receive a time sequence identifier from the partner system (operation S404). The key manager determines whether the local time sequence identifier is smaller than the received one (operation S405).

If so, the key manager discards the current key block, and retrieves a key block and its time sequence identifier from the local key pool (operation S406). The key manager then continues to check whether the local time sequence identifier is smaller than the received one (operation S405). If the local time sequence identifier is not smaller than the received one, the local and received time sequence identifiers are at least equal. The key manager then receives a notification message from the partner system (operation S407). If the notification indicates successful key retrieval (i.e., a successful validation) (operation S408), the key manager forwards the key block to the application (operation S410). Otherwise, the key manager discards the current key block and notifies the application regarding key failure (operation S409).

Figure 4B:
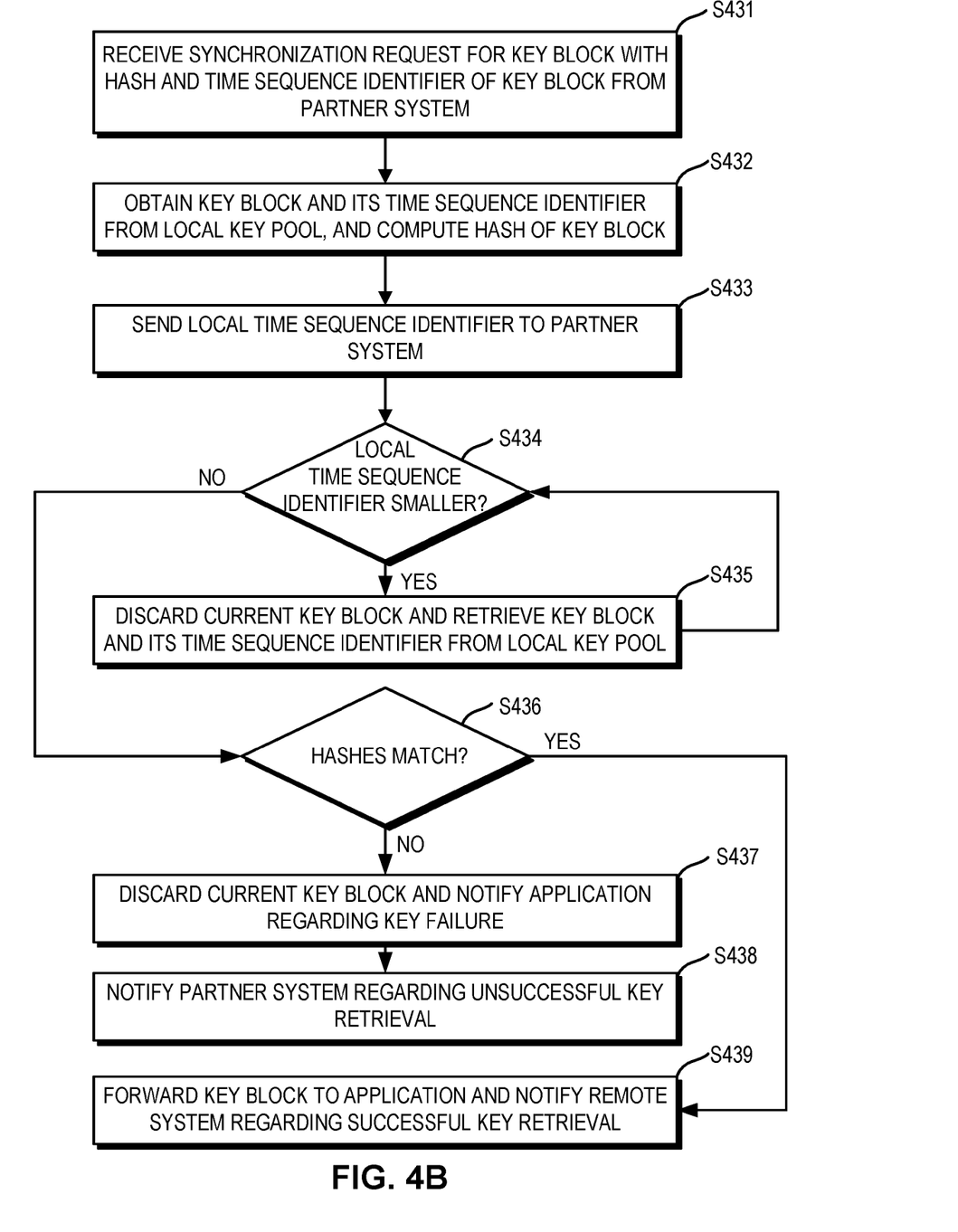
FIG. 4B presents a flowchart illustrating the process of a partner key manager validating a key block, in accordance with an embodiment of the present application.

FIG. 4B presents a flowchart illustrating the process of a partner key engine validating a key block, in accordance with an embodiment of the present application. During operation, the key manager receives a synchronization request for a key block with a hash and time sequence identifier for the key block from the partner system (operation S431). The key manager obtains the key block and its time sequence identifier from the local key pool, and computes a hash of the key block (operation S432). The key manager then sends the local time sequence identifier to the partner system (operation S433).

The key manager determines whether the local time sequence identifier is smaller than the received one (operation S434). If so, the key manager discards the current key block, and retrieves a key block and its time sequence identifier from the local key pool (operation S435). The key manager then continues to check whether the local time sequence identifier is smaller than the received one (operation S435). If the local time sequence identifier is not smaller than the received one, the local and received time sequence identifiers are at least equal. The key manager then checks whether the local and received hashes match (operation S436).

If the hashes do not match, the key manager discards the current key block and notifies the application regarding key failure (operation 5437) and notifies the partner system regarding unsuccessful key retrieval (operation S438). If the hashes match, the key manager forwards the key block to the application and notifies the partner system regarding the successful key retrieval (i.e., a successful validation) (operation S439).

Exemplary Apparatus

Figure 5:
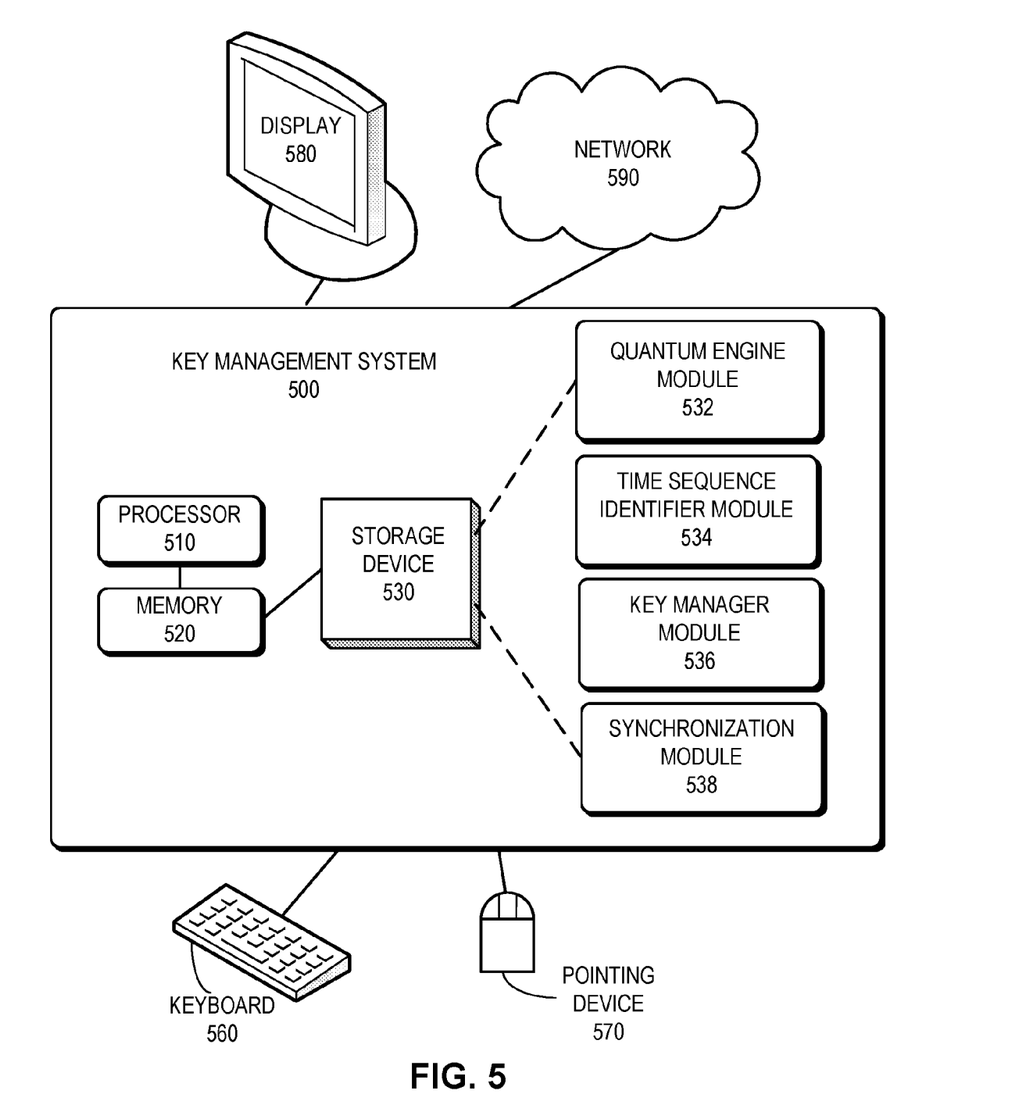
FIG. 5 presents an exemplary key management system, in accordance with an embodiment of the present application.

FIG. 5 presents an exemplary key management system, in accordance with an embodiment of the present application. A key management system 500 can facilitate efficient category management. System 500 includes a processor 510, a memory 520, and a storage device 530. Storage device 530 typically stores instructions that can be loaded into memory 520 and executed by processor 510 to perform the methods described above. In one embodiment, the instructions in storage device 530 can implement a quantum engine module 532, a time sequence identifier module 534, a key manager module 536, and a synchronization module 538, all of which can communicate with each other through various means. Storage device 530 can store a database and memory 520 can store a cache.

In an embodiment, modules 532, 534, 536, and 538 can be partially or entirely implemented in hardware and can be part of processor 510. Further, in an embodiment, key management system 500 may not include a separate processor and memory. Instead, in addition to performing their specific tasks, modules 532, 534, 536, and 538, either separately or in concert, may be part of special-purpose computation engines.

Storage device 530 stores programs to be executed by processor 510. Specifically, storage device 530 stores a program that implements an e-commerce server and/or a web server. During operation, an application program can be loaded from storage device 530 into memory 520 and executed by processor 510. As a result, key management system 500 can perform the functions described above. Key management system 500 can be further coupled to an optional display device 580 (e.g., a monitor, a display pad, a projector, etc.), a keyboard 560, and a pointing device 570, and can be coupled via one or more network interfaces to a network 590.

During operation, key management system 500 can run on a computing device. Quantum engine module 532 operates as the quantum engine of key management system 500. Quantum engine module 532 obtains key sequences based on QKD, and if the length of the key sequence reaches a threshold, generates key blocks of the threshold length, as described in conjunction with FIG. 2A. Time sequence identifier module 534 determines a time sequence identifier for a key block. Key manager module 536 operates as the key manager of the key management system 500. Key manager module 536 obtains a key block and its associated time sequence identifier, and stores them in a local key pool (e.g., in memory 520 and/or storage device 530), as described in conjunction with FIG. 2B. Upon receiving a request for a key from an application, key manager module 536 provides a valid key block to the application.

Synchronization module 538, in conjunction with quantum engine module 532, synchronizes a newly generated key block with a partner system, as described in conjunction with FIGS. 3A and 3B. In this way, prior to providing a key block and its time sequence identifier to key manager module 536, quantum engine module 532 ensures that the key block and the time sequence identifier are synchronized. Furthermore, synchronization module 538, in conjunction with key manager module 536, validates a key block requested by an application with a partner system, as described in conjunction with FIGS. 4A and 4B. In this way, prior to providing the key block to the application, key manager module 536 ensures the key block is valid.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for efficient key management, comprising:
   determining a key block from a key sequence generated based on Quantum Key Distribution (QKD) and a time sequence identifier for the key block, wherein the time sequence identifier indicates a temporal sequence of the key block;
   synchronizing the key block with a corresponding key block of a partner key management system based on a hash of the key block and the time sequence identifier;
   in response to a successful synchronization, storing the key block and the time sequence identifier in a local key pool;
   in response to receiving a request for a key from an application, acquiring the key block from the key pool and validating the key block with the partner key management system based on a hash of the key block and the time sequence identifier; and in response to a successful validation, providing the key block to the application.

2. The method of claim 1, wherein determining the key block from the key sequence comprises:
   determining whether a length of the key sequence has reached a threshold; and
   in response to the length of the key sequence reaching the threshold, obtaining a key block of threshold length from a beginning of the key sequence.

3. The method of claim 1, wherein determining the time sequence identifier comprises obtaining a base value and incrementing the base value.

4. The method of claim 1, wherein synchronizing the key block with the partner key management system comprises:
   computing a hash of the key block;
   sending the key block and the time sequence identifier to the partner key management system; and
   in response to detecting a time sequence identifier mismatch, setting a larger of local and received time sequence identifiers to be a new base value and the time sequence identifier of the key block.

5. The method of claim 4, further comprising discarding the key block in response to determining a hash mismatch of the key block.

6. The method of claim 1, wherein the key pool is a data structure, and wherein a respective element of the data structure includes a key block and an associated time sequence identifier.

7. The method of claim 6, further comprising:
   maintaining a read pointer, which indicates a location of the key pool from which a next key block is retrieved; and
   maintaining a write pointer, which indicates a location of the key pool where a new key block is added.

8. The method of claim 1, wherein validating the key block with a partner key management system comprises:
   computing a hash of the key block;
   obtaining a key block and the time sequence identifier from the partner key management system; and
   in response to detecting a time sequence identifier mismatch, identifying a second key block that provides a time sequence identifier match.

9. The method of claim 7, wherein identifying a second key block includes:
   determining that the time sequence identifier of the key block is less than the obtained time sequence identifier; and
   obtaining, from the key pool, a key block that has a time sequence identifier matching the obtained time sequence identifier and discarding any key block that has a time sequence identifier less than the obtained time sequence identifier from the key pool.

10. A non-transitory machine-readable storage medium storing instructions that when executed by one or more processors cause to perform:
    determining a key block from a key sequence generated based on Quantum Key Distribution (QKD) and a time sequence identifier for the key block, wherein the time sequence identifier indicates a temporal sequence of the key block;
    synchronizing the key block with a corresponding key block of a partner key management system based on a hash of the key block and the time sequence identifier;
    in response to a successful synchronization, storing the key block and the time sequence identifier in a local key pool;
    in response to receiving a request for a key from an application, acquiring the key block from the key pool and validating the key block with the partner key management system based on a hash of the key block and the time sequence identifier; and
    in response to a successful validation, providing the key block to the application.

11. The non-transitory machine-readable storage medium of claim 10, wherein determining the key block from the key sequence comprises:
    determining whether a length of the key sequence has reached a threshold; and
    in response to the length of the key sequence reaching the threshold, obtaining a key block of threshold length from a beginning of the key sequence.

12. The non-transitory machine-readable storage medium of claim 10, wherein determining the time sequence identifier comprises obtaining a base value and incrementing the base value.

13. The non-transitory machine-readable storage medium of claim 10, wherein synchronizing the key block with the partner key management system comprises:
    computing a hash of the key block;
    sending the key block and the time sequence identifier to the partner key management system; and
    in response to detecting a time sequence identifier mismatch, setting a larger of local and received time sequence identifiers to be a new base value and the time sequence identifier of the key block.

14. The non-transitory machine-readable storage medium of claim 13, wherein the instructions that when executed by the one or more processors cause further to perform discarding the key block in response to determining a hash mismatch of the key block.

15. The non-transitory machine-readable storage medium of claim 10, wherein the key pool is a data structure, wherein a respective element of the data structure includes a key block and an associated time sequence identifier.

16. The non-transitory machine-readable storage medium of claim 10, wherein the instructions that when executed by the one or more processors cause further to perform:
    maintaining a read pointer, which indicates a location of the key pool from which a next key block is retrieved; and
    maintaining a write pointer, which indicates a location of the key pool where a new key block is added.

17. The non-transitory machine-readable storage medium of claim 10, wherein validating the key block with a partner key management system comprises:
    computing a hash of the key block;
    obtaining a key block and the time sequence identifier from the partner key management system; and
    in response to detecting a time sequence identifier mismatch, identifying a second key block that provides a time sequence identifier match.

18. The non-transitory machine-readable storage medium of claim 17, wherein identifying a second key block includes:
    determining that the time sequence identifier of the key block is less than the obtained time sequence identifier; and
    obtaining, from the key pool, a key block that has a time sequence identifier matching the obtained time sequence identifier and discarding any key block that has a time sequence identifier less than the obtained time sequence identifier from the key pool.

19. A system for facilitating efficient key management, the computing system comprising:
- a processor; and
- a memory coupled to the processor and storing instructions, which when executed by the processor cause the processor to perform:
- determining a key block from a key sequence generated based on Quantum Key Distribution (QKD) and a time sequence identifier for the key block, wherein the time sequence identifier indicates a temporal sequence of the key block;
- synchronizing the key block with a corresponding key block of a partner key management system based on a hash of the key block and the time sequence identifier;
- in response to a successful synchronization, storing the key block and the time sequence identifier in a local key pool;
- in response to receiving a request for a key from an application, acquiring the key block from the key pool and validating the key block with the partner key management system based on a hash of the key block and the time sequence identifier; and
- in response to a successful validation, providing the key block to the application.

20. The computing system of claim 19, wherein the key pool is a data structure, wherein a respective element of the data structure includes a key block and an associated time sequence identifier.

21. A method for efficient key management, comprising:
- receiving a request for a key from an application running on a computing device;
- acquiring a key block and a time sequence identifier for the key block from a key pool, wherein the key pool comprises key blocks of a key sequence obtained based on Quantum Key Distribution (QKD), wherein the time sequence identifier indicates a temporal sequence of the key block, and wherein the key block is synchronized with a corresponding key block of a partner key management system based on a hash of the key block and the time sequence identifier;
- validating the key block with the partner key management system based on a hash of the key block and the time sequence identifier; and
- in response to a successful validation, providing the key block to the application.

22. The method of claim 21, wherein acquiring the key block from the key sequence includes:
- determining whether a length of the key sequence has reached a threshold; and
- in response to the length of the key sequence reaching the threshold, obtaining the key block of threshold length from a beginning of the key sequence.

* * * * *